United States Patent
Fujishiro et al.

(10) Patent No.: US 9,615,356 B2
(45) Date of Patent: Apr. 4, 2017

(54) USER TERMINAL, NETWORK APPARATUS, AND PROCESSOR

(71) Applicant: KYOCERA CORPORATION, Kyoto (JP)

(72) Inventors: Masato Fujishiro, Yokohama (JP); Chiharu Yamazaki, Tokyo (JP); Noriyoshi Fukuta, Yokohama (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/079,187

(22) Filed: Mar. 24, 2016

(65) Prior Publication Data

US 2016/0205668 A1    Jul. 14, 2016

Related U.S. Application Data

(63) Continuation of application No. PCT/JP2014/075323, filed on Sep. 24, 2014.

(30) Foreign Application Priority Data

Sep. 27, 2013    (JP) ................................. 2013-202766

(51) Int. Cl.
*H04W 4/00* (2009.01)
*H04W 72/04* (2009.01)
(Continued)

(52) U.S. Cl.
CPC ........... *H04W 72/04* (2013.01); *H04W 48/08* (2013.01); *H04W 48/16* (2013.01); *H04W 8/005* (2013.01); *H04W 76/023* (2013.01)

(58) Field of Classification Search
CPC .. H04L 5/0007; H04L 5/0048; H04W 72/044; H04W 72/042; H04W 72/0446
(Continued)

(56) References Cited

U.S. PATENT DOCUMENTS

2011/0268101 A1* 11/2011 Wang ................... H04L 5/0053
                                                                370/344
2014/0003262 A1*  1/2014 He ........................ H04W 28/08
                                                                370/252

(Continued)

OTHER PUBLICATIONS

International Search Report issued in PCT/JP2014/075323; mailed Dec. 22, 2014.

(Continued)

*Primary Examiner* — Andrew Chriss
*Assistant Examiner* — Atique Ahmed
(74) *Attorney, Agent, or Firm* — Studebaker & Brackett PC

(57) ABSTRACT

A user terminal according to an embodiment includes a receiver that receives a list transmitted from a base station, the list including discovery resource configurations; and a controller that selects a discovery resource configuration from among the discovery resource configurations, and uses the selected discovery resource configuration to directly transmit a discovery signal to other user terminals. Each of the discovery resource configurations includes: time resource information indicating time resources used for transmitting a discovery signal and including a variable number substituted into a mathematical expression; frequency resource information indicating frequency resources used for transmitting the discovery signal and including a range of continuous resource block numbers; and power information indicating transmission power used for transmitting the discovery signal.

10 Claims, 8 Drawing Sheets

(51) Int. Cl.
*H04W 48/08* (2009.01)
*H04W 48/16* (2009.01)
*H04W 76/02* (2009.01)
*H04W 8/00* (2009.01)

(58) Field of Classification Search
USPC .......................................................... 370/330
See application file for complete search history.

(56) References Cited

U.S. PATENT DOCUMENTS

| 2014/0112194 A1* | 4/2014 | Novlan | H04W 48/16 370/254 |
| 2016/0112858 A1* | 4/2016 | Nguyen | H04W 8/005 370/329 |

OTHER PUBLICATIONS

Written Opinion issued in PCT/JP2014/075323; mailed Dec. 22, 2014.
3rd Generation Partnership Project; Technical Specification Group Services and System Aspects; Feasibility study for Proximity Services (ProSe); 3GPP TR 22.803; V12.1.0; Mar. 2013; pp. 1-45; Release 12; 3GPP Organizational Partners.

* cited by examiner

FIG. 8

| DISCOVERY ID | MAXIMUM Tx POWER | PUBLIC SAFETY | COMMERCIAL (OPTIONAL) | BAND (OPTIONAL) | SUBFRAME NUMBER (OPTIONAL) | RB NUMBER (OPTIONAL) | OPEN DISCOVERY (OPTIONAL) |
|---|---|---|---|---|---|---|---|
| 1 | 23[dBm] | N | Y | 18 | 0 | 10 | N |
| 2 | 40[dBm] | Y | Y | 14 | 5 | 5 | N |
| 3 | 10[dBm] | N | Y | 1 | 8 | 25 | Y |
| ... | ... | ... | ... | ... | ... | ... | ... |

FIG. 9

| DISCOVERY ID | MAXIMUM Tx POWER | PUBLIC SAFETY | BAND (OPTIONAL) | SUBFRAME NUMBER (OPTIONAL) | RB NUMBER (OPTIONAL) | OPEN DISCOVERY (OPTIONAL) |
|---|---|---|---|---|---|---|
| 1~10 | 23[dBm] | N | 18 | 0 | 10 | N |
| 11 | 40[dBm] | Y | 14 | 5 | 5 | N |
| 12~... | 10[dBm] | N | 1 | 8 | 25 | Y |
| ... | ... | ... | ... | ... | ... | ... |

USER TERMINAL, NETWORK APPARATUS, AND PROCESSOR

TECHNICAL FIELD

The present disclosure relates to a user terminal, a network apparatus, and a processor in a mobile communication system supporting D2D communication.

BACKGROUND ART

In the 3rd Generation Partnership Project (3GPP), which is a standardization project for a mobile communication system, the introduction of terminal-to-terminal (Device to Device: D2D) communication is considered as a new function launched from the release 12 (refer to Non Patent Literature 1).

In D2D communication, a plurality of closely-located user terminals directly performs terminal-to-terminal communication not via a core network. On the other hand, in cellular communication, which is normal communication of a mobile communication system, a user terminal performs communication via a core network.

Meanwhile, for discovering a partner terminal of D2D communication, for example, a user terminal transmits a discovery signal used for discovering a user terminal near the user terminal. By receiving a response to the transmitted discovery signal, the user terminal can discover another user terminal that exists near itself. If the discovered other user terminal can perform D2D communication, the user terminal can perform D2D communication.

CITATION LIST

Non Patent Literature

Non Patent Literature 1: 3GPP Technical Report "TR 22.803 V12.1.0", March 2013

SUMMARY OF DISCLOSURE

If, however, a user terminal can freely transmit a discovery signal, the transmitted discovery signal may interfere with a user terminal located near the user terminal. It is therefore assumed that a network apparatus such as a base station transmits, to a user terminal, a predetermined condition for regulating (i.e., controlling) the transmission of discovery signals.

Nevertheless, when a network apparatus transmits the predetermined condition (in particular, condition with a number of control items) to a user terminal, there arises a problem of increase in overhead (i.e., consumption of radio resources).

In addition, when a network apparatus transmits a predetermined condition to a user terminal for regulating the reception of discovery signals, from the aspect of security, there arises a problem of increase in overhead as well.

Thus, an object of the present disclosure is to provide a user terminal and a network apparatus that can suppress increase in overhead when controlling the transmission and/or reception of discovery signals.

A user terminal according to an embodiment includes a receiver that receives a list transmitted from a base station, the list including discovery resource configurations; and a controller that selects a discovery resource configuration from among the discovery resource configurations, and uses the selected discovery resource configuration to directly transmit a discovery signal to other user terminals. Each of the discovery resource configurations includes: time resource information indicating time resources used for transmitting a discovery signal and including a variable number substituted into a mathematical expression; frequency resource information indicating frequency resources used for transmitting the discovery signal and including a range of continuous resource block numbers; and power information indicating transmission power used for transmitting the discovery signal.

BRIEF DESCRIPTION OF DRAWINGS

FIG. 8 is a diagram illustrating an example of a discovery signal list according to the present embodiment.

FIG. 9 is a diagram illustrating another example of a discovery signal list according to the present embodiment.

DESCRIPTION OF EMBODIMENTS

Overview of Embodiments

Figure 1:
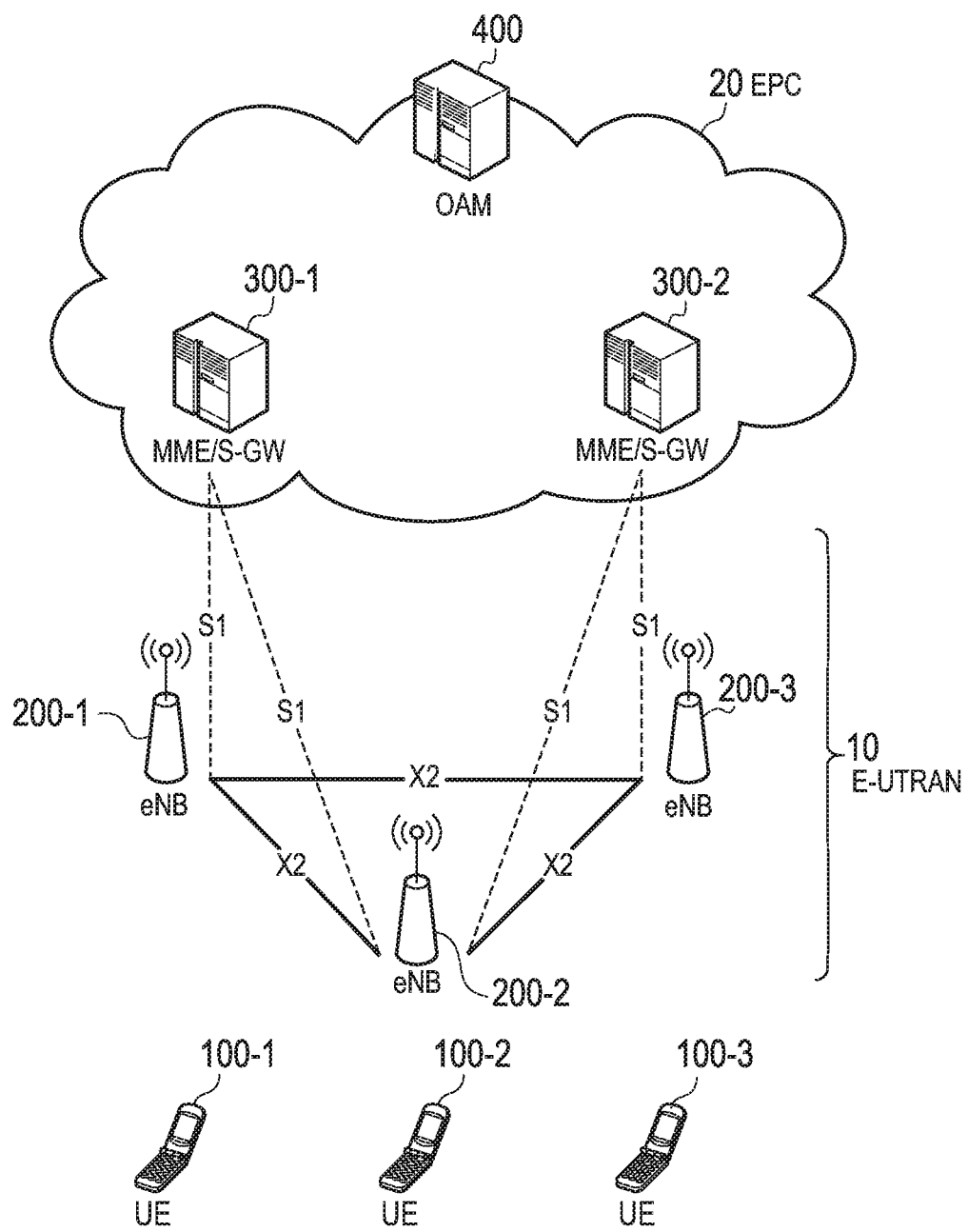
FIG. 1 is a configuration diagram of a Long Term Evolution (LTE) system.

A user terminal according to an embodiment is a user terminal in a mobile communication system supporting D2D communication being direct terminal-to-terminal communication. The user terminal includes: a storage configured to store a discovery signal list relating: to a plurality of conditions for controlling transmission and/or reception of a discovery signal used for discovery of another user terminal existing near the user terminal; and to a plurality of identifiers consisting of identifiers respectively associated with the plurality of conditions; a receiver configured to receive a specific identifier specified by a network apparatus storing the discovery signal list, wherein the specific identifier is specified from among the plurality of identifiers; and a controller configured to perform control to transmit and/or receive the discovery signal according to a specific condition associated with the specific identifier from among the plurality of conditions.

In the user terminal according to an embodiment, the controller performs control to transmit an identifier request for requesting the specific identifier.

In the user terminal according to an embodiment, in a case in which the discovery signal is transmitted and/or received after an effective period of the specific identifier has passed, the controller performs control to transmit the identifier request.

In the user terminal according to an embodiment, the identifier request includes selection information used for selecting an identifier that can be specified, from among the plurality of identifiers, when the network apparatus specifies the specific identifier.

In the user terminal according to an embodiment, before transmitting and/or receiving the discovery signal, the controller performs control to transmit a list request for requesting the discovery signal list, to the network apparatus, and the receiver receives the discovery signal list transmitted from the network apparatus in response to the list request.

In the user terminal according to an embodiment, the plurality of conditions includes a condition for controlling at least one of: transmission power for the discovery signal; application of the discovery signal; a frequency range used for transmission and/or reception of the discovery signal; a radio resource used for transmission and/or reception of the discovery signal; and an open discovery indicating whether the user terminal is discovered from a large indefinite number of user terminals.

In the user terminal according to an embodiment, the radio resource is a common radio resource shared with cellular communication being communication performed via a core network.

In the user terminal according to the other embodiments, the receiver receives the discovery signal from the another user terminal. The discovery signal from the another user terminal includes another specific identifier specified by the network apparatus from among the plurality of identifiers. The controller performs control to transmit discovery information including the other specific identifier, to the network apparatus. In a case in which it is determined based on the specific condition and a specific condition associated with the other specific identifier, that the discovery signal of the user terminal and the discovery signal of the another user terminal interfere with each other, the controller performs control to receive a specific identifier newly specified from among the plurality of identifiers, from the network apparatus instead of the specific identifier.

A network apparatus according to an embodiment is a network apparatus in a mobile communication system supporting D2D communication being direct terminal-to-terminal communication. The network apparatus includes: a storage configured to store a discovery signal list relating: to a plurality of conditions for controlling transmission and/or reception of a discovery signal used for discovery of another user terminal existing near a user terminal; and to a plurality of identifiers consisting of identifiers respectively associated with the plurality of conditions; a controller configured to specify, for causing the user terminal storing the discovery signal list to transmit and/or receive the discovery signal according a specific condition among the plurality of conditions, a specific identifier associated with the specific condition, from among the plurality of identifiers; and a transmitter configured to transmit the specific identifier to the user terminal.

The network apparatus according to an embodiment further includes a receiver configured to receive an identifier request for requesting the specific identifier, from the user terminal. The controller specifies the specific identifier based on the identifier request.

In the network apparatus according to an embodiment, the identifier request includes selection information used for selecting identifiers that can be specified, from among the plurality of identifiers, when the controller specifies the specific identifier. The controller specifies the specific identifier from among the identifiers that can be specified, based on the selection information.

The network apparatus according to an embodiment further includes a receiver configured to receive a list request for requesting the discovery signal list, from the user terminal before the specific identifier is transmitted to the user terminal. The transmitter transmits the discovery signal list to the user terminal in response to the list request.

In the network apparatus according to an embodiment, the plurality of conditions includes a condition for controlling at least one of: transmission power for the discovery signal; application of the discovery signal; a frequency range used for transmission and/or reception of the discovery signal; a radio resource used for transmission and/or reception of the discovery signal; and an open discovery indicating whether the user terminal is discovered from a large indefinite number of user terminals.

In the network apparatus according to an embodiment, the specific condition includes a condition for controlling a radio resource used for transmission and/or reception of the discovery signal. After specifying the specific identifier, based on the specific condition, the controller allocates a common radio resource shared with the radio resource, to a user terminal that performs cellular communication being communication performed via a core network.

The network apparatus according to other embodiments further includes a receiver configured to receive, from the user terminal, discovery information including another specific identifier allocated by the controller to another user terminal from among the plurality of identifiers. In a case in which it is determined based on the specific condition and a specific condition associated with the other specific identifier, that the discovery signal of the user terminal and the discovery signal of the another user terminal interfere with each other, the controller specifies a new specific identifier from among the plurality of identifiers, instead of the specific identifier or the other specific identifier. The transmitter transmits the new specific identifier to the user terminal or the another user terminal.

A processor according to other embodiments is a processor included in a user terminal in a mobile communication system supporting D2D communication being direct terminal-to-terminal communication. The processor executes processes of: storing a discovery signal list relating: to a plurality of conditions for controlling transmission and/or reception of a discovery signal used for discovery of another user terminal existing near the user terminal; and to a plurality of identifiers consisting of identifiers respectively associated with the plurality of conditions; receiving a specific identifier specified by a network apparatus storing the discovery signal list, from among the plurality of identifiers; and a control process unit configured to perform control to transmit and/or receive the discovery signal according to a specific condition associated with the specific identifier from among the plurality of conditions.

In addition, the network apparatus set forth in the appended claims may be an apparatus that forms a core network, or may be a base station.

First Embodiment

LTE System

FIG. 1 is a configuration diagram of an LTE system according to the present embodiment.

As illustrated in FIG. 1, the LTE system according to the first embodiment includes UE (User Equipment) 100, E-UTRAN (Evolved-UMTS Terrestrial Radio Access Network) 10, and EPC (Evolved Packet Core) 20. The E-UTRAN 10 and EPC 20 configures a network.

The UE 100 is a mobile communication device, which performs radio communication with a cell (a serving cell) to which the UE 100 connects. The UE 100 corresponds to a user terminal.

The E-UTRAN 10 includes a plurality of eNBs 200 (an evolved Node-Bs). The eNB 200 corresponds to a base station. The eNB 200 manages cell and performs radio communication with the UE 100 connecting to the cell. Note that a connection between the eNB 200 and the UE 100 may be referred to as a connection between the cell managed by the eNB 200 and the UE 100 as the same meaning.

The "cell" is used as a term indicating a smallest unit of a radio communication area, and is also used as a term indicating a function of performing radio communication with the UE 100.

The eNB 200 has a radio resource management (RRM) function, a routing function for user data, a measurement control function for mobility control and scheduling and the like.

The EPC 20 includes MME (Mobility Management Entity)/S-GW (Serving-Gateway) 300 and OAM (Operation and Maintenance) 400. The EPC 20 corresponds to a core network.

The MME is a network node performing different types of mobility control and the like for the UE 100, and corresponds to a control station. The S-GW is a network node performing transfer control of the user data, and corresponds to an exchange station.

The eNBs 200 are connected mutually via an X2 interface. The eNB 200 is connected to the MME/S-GW 300 via an S1 interface.

The OAM 400 is a server apparatus managed by operator, and performs maintenance and monitoring of the E-UTRAN 10.

Next, the configurations of the UE 100 and the eNB 200 will be described.

Figure 2:
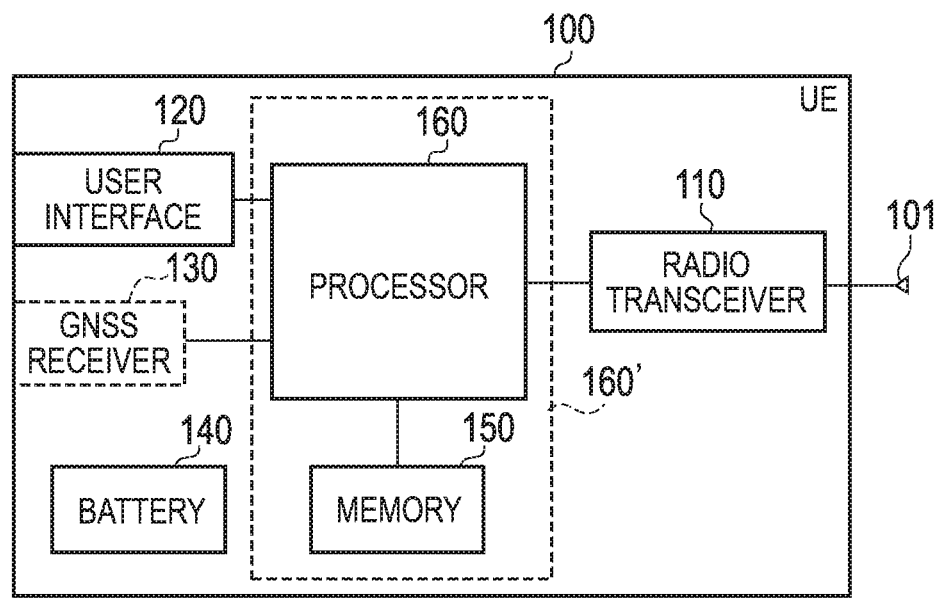
FIG. 2 is a block diagram of a user equipment (UE).

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 corresponds to storage, and the processor 160 corresponds to a controller.

The UE 100 may not necessarily have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into a radio signal and transmits the radio signal from the antenna 101. Furthermore, the radio transceiver 110 converts a radio signal received by the antenna 101 into a baseband signal and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100 and outputs the received signal to the processor 160.

The battery 140 accumulates a power to be supplied to each block of the UE 100.

The memory 150 stores a program to be executed by the processor 160 and information to be used for processing by the processor 160.

The processor 160 includes a baseband processor that performs modulation and demodulation, encoding and decoding and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

Figure 3:
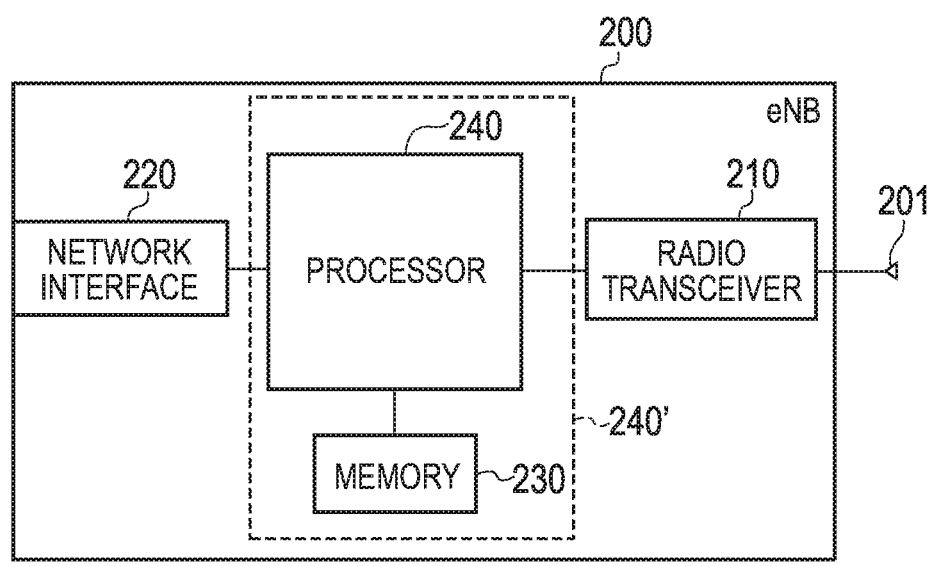
FIG. 3 is a block diagram of an evolved Node-B (eNB).

FIG. 3 is a block diagram of the eNB 200. As illustrated in FIG. 3, the eNB 200 includes an antenna 201, a radio transceiver 210, a network interface 220, a memory 230, and a processor 240. The memory 230 corresponds to storage, and the processor 240 corresponds to a controller. The memory 230 may be integrally formed with the processor 240, and this set (that is, a chip set) may be called a processor 240'.

The antenna 201 and the radio transceiver 210 are used to transmit and receive a radio signal. The antenna 201 includes a plurality of antenna elements. The radio transceiver 210 converts a baseband signal output from the processor 240 into a radio signal and transmits the radio signal from the antenna 201. Furthermore, the radio transceiver 210 converts a radio signal received by the antenna 201 into a baseband signal and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240.

The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Figure 4:
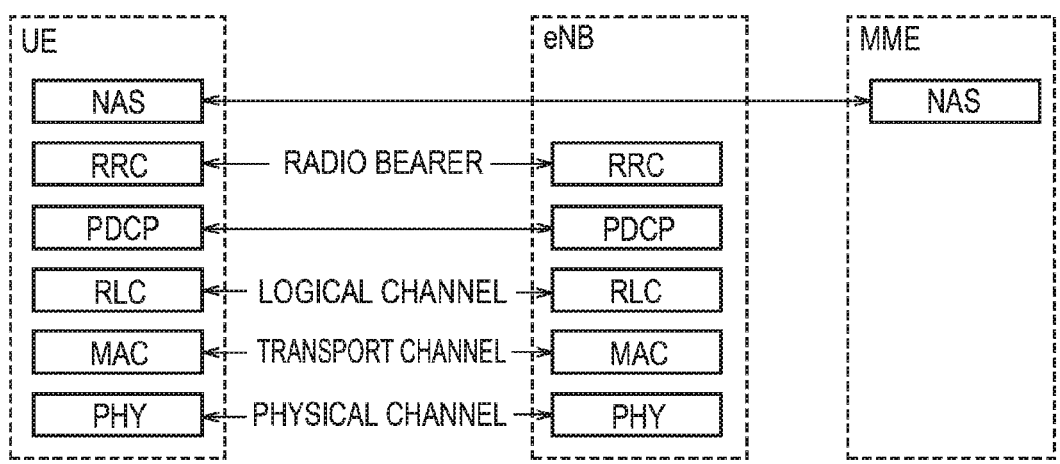
FIG. 4 is a protocol stack diagram of a radio interface in the LTE system.

FIG. 4 is a protocol stack diagram of a radio interface in the LTE system.

As illustrated in FIG. 4, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, a retransmission process by a hybrid ARQ (HARQ), and the like. Between the MAC layer of the UE 100 and the MAC layer of the eNB 200, user data and control signals are transmitted via a transport channel. The MAC layer of the eNB 200 includes a scheduler for determining a transport format (a transport block size and a modulation and coding scheme) of an uplink and a downlink, and resource blocks to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (an RRC message) for various types of settings is transmitted. The RRC layer controls a logical channel, a transport channel, and a physical channel according to the establishment, re-establishment, and release of a radio bearer. When there is an RRC connection between the RRC of the UE 100 and the RRC of the eNB 200, the UE 100 is in a connected state. Otherwise, the UE 100 is in an idle state.

An NAS (Non-Access Stratum) layer positioned above the RRC layer performs session management, mobility management and the like.

Figure 5:
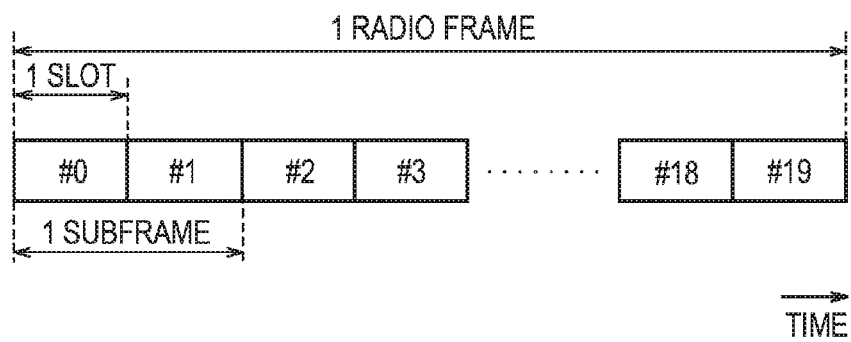
FIG. 5 is a configuration diagram of a radio frame used in the LTE system.

FIG. 5 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. A resource unit configured by one subcarrier and one symbol is referred to as resource element (RE).

Of the radio resources (time and frequency resources) assigned to the UE 100, a frequency resource can be identified by a resource block and a time resource can be identified by a subframe (or a slot).

In the downlink, an interval of several symbols at the head of each subframe is a region used as a physical downlink control channel (PDCCH) for mainly transmitting a control signal. Furthermore, the remaining interval of each subframe is a region available as a physical downlink shared channel (PDSCH) for mainly transmitting user data. Cell-specific reference signals (CRSs) are dispersedly allocated in each subframe.

In the uplink, both ends in the frequency direction of each subframe are regions used as a physical uplink control channel (PUCCH) for mainly transmitting a control signal. The remaining portion in each subframe is a region available as a physical uplink shared channel (PUSCH) for mainly transmitting user data. Demodulation reference signal (DMRS) and sounding reference signal (SRS) are dispersedly allocated in each subframe.

(D2D Communication)

Next, the description will be given based on the comparison between normal communication of the LTE system (cellular communication) and D2D communication.

Figure 6:
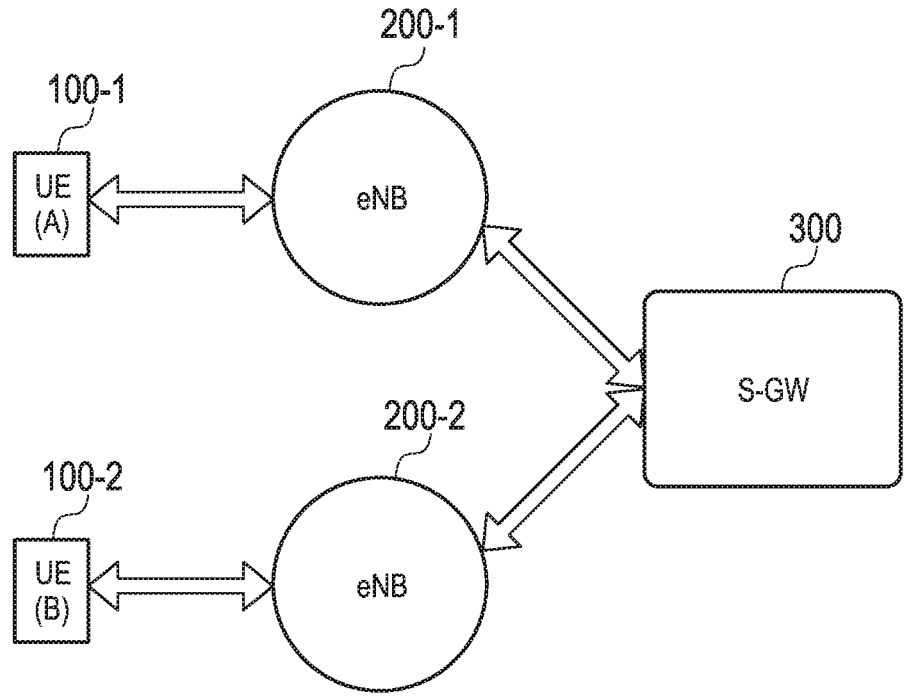
FIG. 6 is a diagram illustrating a data path in cellular communication.

FIG. 6 is a diagram illustrating a data path in cellular communication. FIG. 6 illustrates, as an example, a case in which cellular communication is performed between a UE 100-1, which has established connection with an eNB 200-1, and a UE 100-2, which has established connection with an eNB 200-2. In addition, a data path means a transfer path of user data (user plane).

As illustrated in FIG. 6, the data path of cellular communication passes through a network. Specifically, the data path passing through the eNB 200-1, the S-GW 300, and the eNB 200-2 is set.

Figure 7:
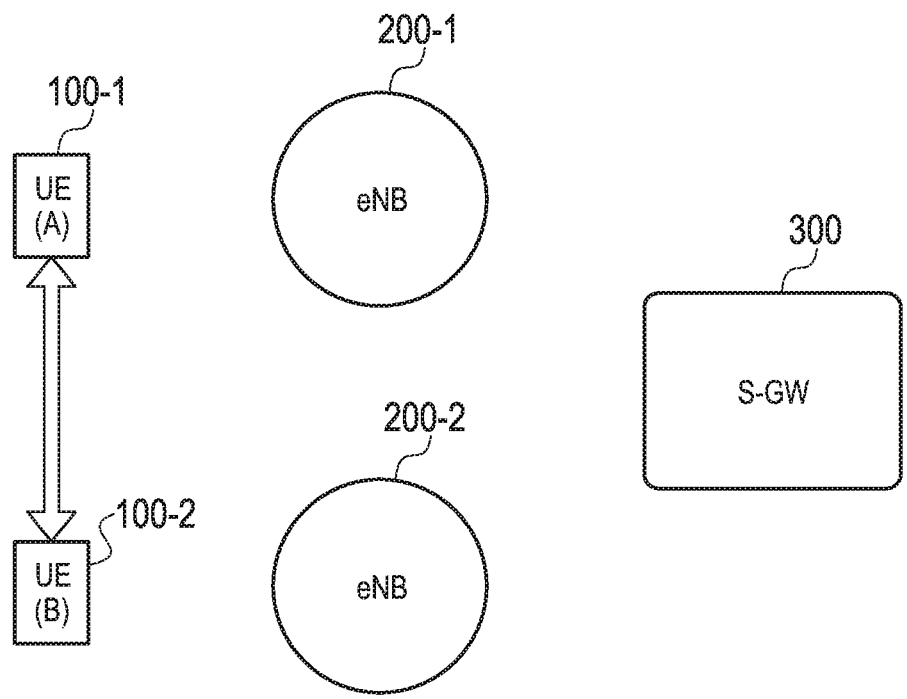
FIG. 7 is a diagram illustrating a data path in D2D communication.

FIG. 7 is a diagram illustrating a data path in D2D communication. FIG. 7 illustrates, as an example, a case in which D2D communication is performed between the UE 100-1, which has established connection with the eNB 200-1, and the UE 100-2, which has established connection with the eNB 200-2.

As illustrated in FIG. 7, the data path of D2D communication does not pass through a network. In other words, direct radio communication is performed between the UEs. In this manner, if the UE 100-2 exists near the UE 100-1, D2D communication is performed between the UEs 100-1 and 100-2. This brings about an effect such as the reduction in network traffic load and battery consumption of the UE 100.

In addition, as a case in which D2D communication is started, there are the following cases: (a) case in which D2D communication is started after a partner terminal is discovered by performing an operation for discovering a partner terminal; and (b) case in which D2D communication is started without performing an operation for discovering a partner terminal.

For example, in the above case (a), when one UE 100 of the UEs 100-1 and 100-2 discovers another UE 100 that exists near the one UE 100, D2D communication is started.

In this case, the UE 100 has a function (discover function) of discovering another UE 100 that exists near itself, for discovering a partner terminal, and/or a function (discoverable function) of being discovered by another UE 100.

In addition, the UE 100 does not have to necessarily perform D2D communication even if the UE 100 discovers a partner terminal. For example, after the UEs 100-1 and 100-2 discover each other, the UEs 100-1 and 100-2 may negotiate with each other to determine whether to perform D2D communication. The UEs 100-1 and 100-2 each start D2D communication when the UEs 100-1 and 100-2 have agreed to perform D2D communication. In addition, when the UE 100-1 does not perform D2D communication after the UE 100-1 discovers a partner terminal, the UE 100-1 may report the discovery of a closely-located UE 100 (i.e., the UE 100-2) to an upper layer (e.g., an application, etc.). For example, the application can execute processing that is based on the report (e.g., processing of plotting the position of the UE 100-2 on map information).

In addition, the UE 100 can report the discovery of a partner terminal to the eNB 200, and receive an instruction as to whether to perform communication with the partner terminal via cellular communication or via D2D communication, from the eNB 200.

On the other hand, in the above case (b), for example, the UE 100-1 starts the transmission (notification by broadcast, etc.) of a signal for D2D communication, without identifying a partner terminal. The UE 100 can thereby start D2D communication regardless of whether a partner terminal has been discovered or not. In addition, the UE 100-2 performs an operation of waiting for a signal for D2D communication, and performs synchronization or/and demodulation based on the signal from the UE 100-1.

(Discovery Signal List)

Next, a discovery signal list according to the present embodiment will be described using FIGS. 8 and 9. FIG. 8 is a diagram illustrating an example of a discovery signal list according to the present embodiment. FIG. 9 is a diagram illustrating another example of a discovery signal list according to the present embodiment.

The discovery signal list is a list for controlling the transmission and/or reception of discovery signals (discovery signals/discoverable signals). Specifically, the discovery signal list is a list relating to a plurality of conditions for controlling the transmission and/or reception of discovery signals, and to a plurality of identifiers including identifiers respectively associated with the plurality of conditions. In the present embodiment, the discovery signal list is used for controlling the transmission of discovery signals.

As illustrated in FIG. 8, the discovery signal list according to the present embodiment includes "discovery identifier (Discovery ID)" as an identifier item, and "maximum transmission power (Maximum Tx Power)", "public safety (Public Safety)", "commercial (Commercial)", "band (Band)", "subframe number (Subframe Number)", "resource block number (RB Number)", and "open discovery (Open Discovery)" as condition items.

The discovery identifier is an identifier associated with each of a plurality of conditions for controlling the transmission (and/or reception) of discovery signals. In FIG. 8, each of the plurality of discovery identifiers may be allocated to a single UE 100, or may be allocated to a plurality of UEs 100. In addition, a single discovery identifier may be allocated to a single UE 100, or a plurality of discovery identifiers may be allocated to a single UE 100.

The maximum transmission power is an item for indicating the range of transmission power for discovery signals. Specifically, the maximum transmission power indicates the maximum transmission power for discovery signals. In FIG. 8, the maximum transmission power is indicated by an immediate value. Alternatively, the maximum transmission power is indicated by a level (class) (e.g., Low/Mid/High).

The public safety and the commercial are items for indicating the applications of discovery signals. Specifically, when the public safety is applied, discovery signals are used for discovery in a Public Safety Proximity Service (ProSe). In addition, the public safety indicates that D2D communication (discovery/communication) can be operated within and outside the coverage of an E-UTRAN. Thus, when the public safety is applied, discovery signals can be transmitted (and/or received) even outside the coverage of the E-UTRAN.

In addition, when the commercial is applied, discovery signals are used for discovery in a Commercial Proximity Service (Commercial ProSe). In addition, the commercial indicates that D2D communication (discovery/communication) can be operated within the coverage of an E-UTRAN. Thus, when the commercial is applied, discovery signals can be transmitted (and/or received) only within the coverage of the E-UTRAN. In addition, the commercial may be optional.

The band is an item for indicating a frequency band that can be used for the transmission of discovery signals. In FIG. 8, the band is indicated by a band number (band number). Alternatively, the band may be indicated by a center frequency and a frequency range, may be indicated by a subcarrier number, or may be indicated by a frequency number. The frequency number may be indicated by an E-UTRAN Absolute Radio Frequency Channel Number (EARFCN). Yet alternatively, the band may be indicated by a range of a frequency that can be used for the transmission of discovery signals. In addition, the band may be optional.

The subframe number and the resource block number are items for indicating radio resources used for the transmission of discovery signals. Specifically, the subframe number is an item for indicating a subframe number that can be used for the transmission of discovery signals. In FIG. 8, the subframe number is indicated by an immediate value. Alternatively, the subframe number may be indicated by a mathematical expression for calculating a subframe number by substituting a variable number, or a variable number substituted into the mathematical expression. In addition, the subframe number may be optional. In addition, the resource block number is an item for indicating a resource block number that can be used for the transmission of discovery signals. In FIG. 8, the resource block number is indicated by an immediate value. Alternatively, the resource block number may be indicated by a range of a resource block number that can be used for the transmission of discovery signals. In addition, the resource block number may be optional.

The open discovery is an item for indicating whether a UE 100 is discovered from a large indefinite number of UEs 100. Thus, when the open discovery is not applied, only a UE 100 that has received discovery permission from a UE 100 that has transmitted a discovery signal can discover the UE 100 that has transmitted the discovery signal. On the other hand, when the open discovery is applied, even a UE 100 that has not received discovery permission from the UE 100 that has transmitted the discovery signal can discover the UE 100 that has transmitted the discovery signal.

In addition, the discovery signal list may be a discovery signal list as illustrated in FIG. 9. In FIG. 9, discovery identifiers having a plurality of identical conditions are combined into a group (pool). Each of the plurality of discovery identifiers is allocated to only a single UE 100. Thus, a UE 100 may use an allocated discovery identifier as an individual identifier included in a discovery signal that the UE 100 actually transmits.

The other items are similar to the above-described items.

In the present embodiment, the discovery signal list is stored into each of the UE 100, the eNB 200, and a network apparatus (NW) 500, as described later.

(Schematic Operation of Mobile Communication System)

Next, a schematic operation of a mobile communication system according to the present embodiment will be described using FIGS. 10 to 12. In addition, in the sequence diagrams illustrated in FIGS. 10 to 12, a dotted line arrow indicates that an operation indicated by the dotted line arrow is optional.

(1) Sharing of Discovery Signal List

First, sharing of a discovery signal list according to the present embodiment will be described using FIG. 10. FIG. 10 is a sequence diagram illustrating an operation example in sharing of a discovery signal list according to the present embodiment.

The following description will be given assuming that the network apparatus (NW) 500 creates and manages a discovery signal list, and the UE 100 and the eNB 200 do not store a discovery signal list.

Figure 10:
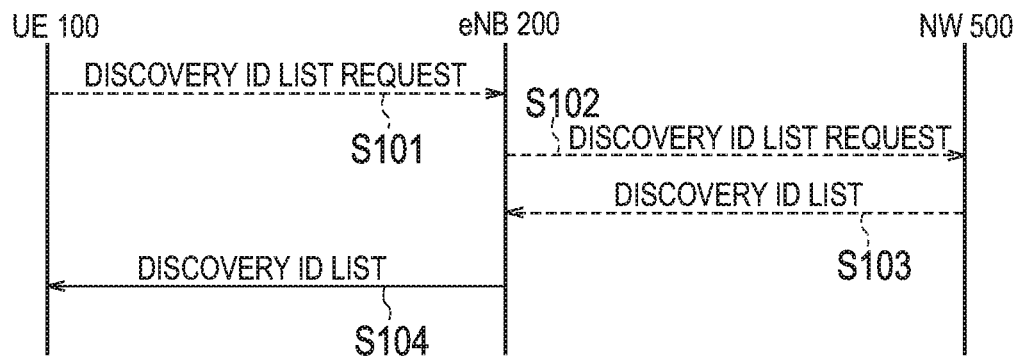
FIG. 10 is a sequence diagram illustrating an operation example in sharing of a discovery signal list according to the present embodiment.

As illustrated in FIG. 10, in step S101, the UE 100 transmits a list request (Discovery ID list request) for requesting a discovery signal list, to the eNB 200. The eNB 200 receives the list request.

In step S102, the eNB 200 transmits the list request to the NW 500. The NW 500 receives the list request.

In step S103, in response to the list request, the NW 500 transmits a discovery signal list to the eNB 200. The eNB 200 receives the discovery signal list.

In step S104, the eNB 200 transmits the discovery signal list to the UE 100. The UE 100 receives the discovery signal list.

The eNB 200 may transmit a discovery signal list using a management information block (MIB) or a system information block (SIB), or may transmit a discovery signal list with the discovery signal list contained in a radio resource control (RRC) message.

In the above-described manner, the UE 100, the eNB 200, and the NW 500 share the discovery signal list.

In addition, when a discovery signal list is stored in the eNB 200, the eNB 200 may transmit a discovery signal list to the UE 100 without transmitting a list request to the NW 500.

In addition, the UE 100 may store the discovery signal list into the memory 150. The UE 100 may update the discovery signal list stored in the memory 150, based on a discovery signal list that has been received from the eNB 200. Furthermore, the eNB 200 may also update a discovery signal list stored in the memory 230, based on a discovery signal list that has been received from the NW 500.

(2) Discovery of Partner Terminal in D2D Communication

Next, discovery of a partner terminal in D2D communication according to the present embodiment will be described using FIG. 11. FIG. 11 is a sequence diagram illustrating an operation example of discovery of a partner terminal in D2D communication according to the present embodiment.

The UE 100-1, the UE 100-2, and the eNB 200 store a discovery signal list.

Figure 11:
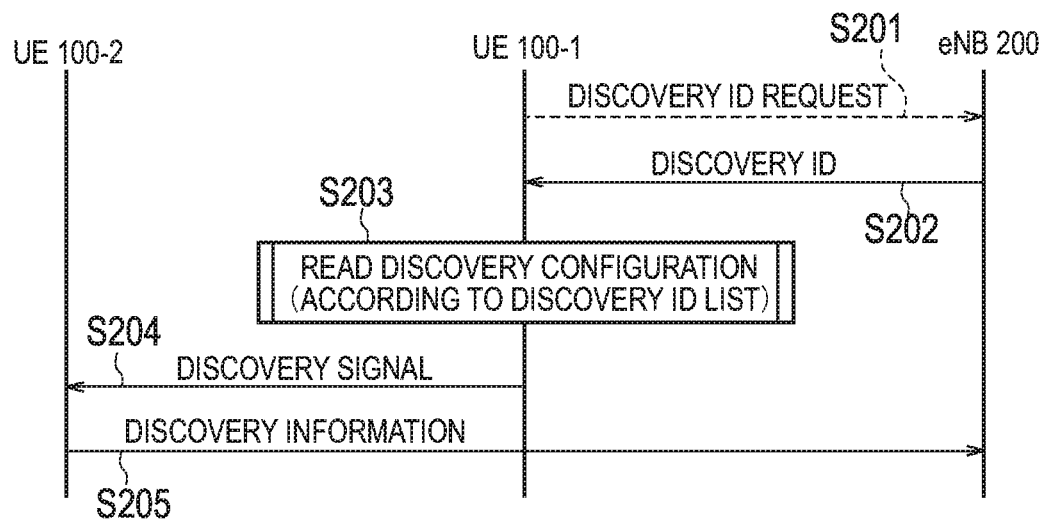
FIG. 11 is a sequence diagram illustrating an operation example of discovery of a partner terminal in D2D communication according to the present embodiment.

As illustrated in FIG. 11, in step S201, the UE 100-1 transmits an identifier request (Discovery ID request) to the eNB 200. The eNB 200 receives the identifier request.

The identifier request is a request for requesting a specific discovery identifier specified by the eNB 200 (or the NW 500) from among a plurality of discovery identifiers in the discovery signal list. The identifier request may include selection information used for selecting an identifier that can be specified, from among the plurality of discovery identifiers, when the eNB 200 (or the NW 500) specifies a specific discovery identifier. Examples of selection information include information indicating the maximum transmission power of the UE 100-1, a frequency band that can be used by the UE 100-1, the purpose of D2D communication (e.g., advertisement distribution purpose), or an application identifier used for D2D communication.

Based on the identifier request, the eNB 200 specifies a specific discovery identifier from among a plurality of discovery identifiers in the discovery signal list. In the present embodiment, the eNB 200 starts specifying a discovery identifier in response to the reception of the identifier request.

When the identifier request includes selection information, the eNB 200 may specify a specific discovery identifier from among a plurality of discovery identifiers based on the selection information. Specifically, based on the selection information, the eNB 200 specifies a discovery identifier that can be specified, from among the plurality of discovery identifiers. For example, the eNB 200 removes a discovery identifier that requires the use of a frequency band outside a frequency band that can be used by the UE 100-1, from discovery identifier candidates to be allocated to the UE 100-1. The eNB 200 specifies a specific discovery identifier from among the remaining discovery identifier candidates.

In addition, using an identifier of the UE 100-1 (UE-ID) that is included in the identifier request, the eNB 200 may inquire of a network about information (e.g., contract information) for selecting an identifier that can be specified, from among a plurality of discovery identifiers. For example, the eNB 200 may acquire information about a condition of the UE 100-1 (e.g., a contract condition of a ProSe for advertisement distribution, a frequency band that can be used) from a network. Based on the acquired information, the eNB 200 may select discovery identifiers that can be specified, and specify a specific discovery identifier from among the discovery identifiers that can be specified.

In addition, when the identifier request includes an application identifier, the eNB 200 may transmit the application identifier to the network, and acquire information such as authentication information related to an application (e.g., an application license agreement between an operator and a third party related to the application). Based on the acquired information, the eNB 200 may select discovery identifiers that can be specified, and specify a specific discovery identifier from among the discovery identifiers that can be specified.

In step S202, the eNB 200 transmits a specific identifier, which is a specified discovery identifier, to the UE 100-1. The UE 100-1 receives the specific identifier.

In step S203, the UE 100-1 reads a discovery setting. Specifically, based on the received specific identifier and the discovery signal list, the UE 100-1 identifies a condition (specific condition) associated with the specific identifier, from among a plurality of conditions. The UE 100-1 sets the identified condition as a transmission condition of a discovery signal.

In step S204, the UE 100-1 starts transmitting a discovery signal according to the specific condition. The UE 100-2 receives the discovery signal from the UE 100-1.

In addition, when the discovery signal includes an identifier indicating the UE 100-1, the UE 100-2 can identify the UE 100-1 based on the identifier of the UE 100-2. Alternatively, when information for identifying the UE 100-1 is recorded in the discovery signal list, the UE 100-2 can identify the UE 100-1 based on the discovery signal list. For example, when the discovery signal includes a discovery identifier, and the discovery identifier is associated with an identifier of a UE 100 that has transmitted the discovery signal (i.e., the identifier of the UE 100-2), the UE 100-2 can identify the UE 100-1 based on the discovery signal list. In addition, when the UE 100-2 can identify the UE 100-1 that has transmitted the discovery signal, an operation in next step S205 may be omitted.

In step S205, the UE 100-2 transmits discovery information to the eNB 200. The eNB 200 receives the discovery signal.

The discovery information is information indicating that the discovery signal has been received. When the discovery signal includes a discovery identifier, the UE 100-2 may transmit, to the eNB 200, discovery information with the discovery identifier contained in the discovery information.

When the eNB 200 receives discovery information from the UE 100-2, the eNB 200 may transmit the identifier indicating the UE 100-1 that has transmitted the discovery signal, to the UE 100-2 as a response to the discovery information. With this configuration, even if the UE 100-2 has failed to identify the transmission source of the discovery signal, the UE 100-2 can identify the transmission source of the discovery signal based on the response from the eNB 200.

Then, the UE 100-2 transmits, to the UE 100-1, a response indicating that the discovery signal has been received. After exchanging necessary information, the UEs 100-1 and 100-2 start D2D communication.

When the UEs 100-1 and 100-2 end the D2D communication, the UEs 100-1 and 100-2 transmit, to the eNB 200, end information indicating that the D2D communication has ended. When the eNB 200 receives the end information, the eNB 200 updates the discovery signal list by setting the discovery identifiers respectively allocated to the UEs 100-1 and 100-2, as unallocated discovery identifiers.

In addition, even if the eNB 200 does not receive end information from the UEs 100-1 and 100-2, when an effective period of the discovery identifiers passes, the eNB 200 may update the discovery signal list by setting the discovery identifiers respectively allocated to the UEs 100-1 and 100-2, as unallocated discovery identifiers.

(3) Scheduling of eNB 200

Next, scheduling of the eNB 200 according to the present embodiment will be described using FIG. 12. FIG. 12 is a sequence diagram illustrating an operation example of scheduling of the eNB 200 according to the present embodiment.

The eNB 200 is connected to a UE 100-3, which performs cellular communication being communication performed via a core network.

Figure 12:
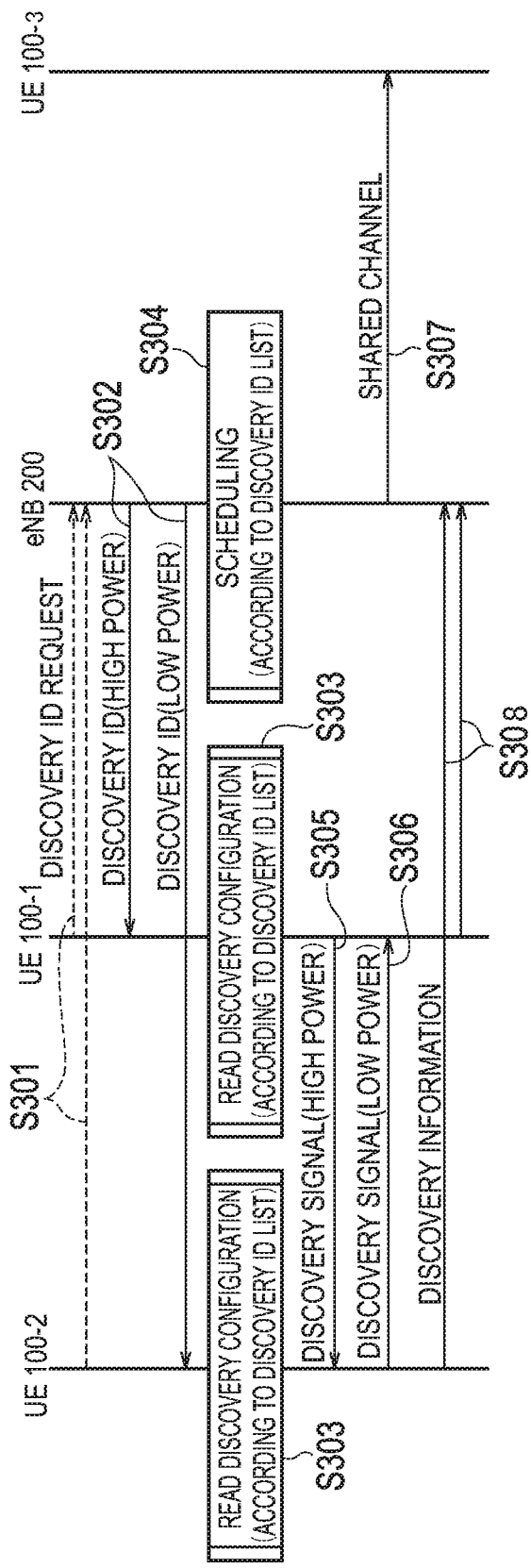
FIG. 12 is a sequence diagram illustrating an operation example of scheduling of an eNB 200 according to the present embodiment.

As illustrated in FIG. 12, steps S301 to S303 correspond to steps S201 to S203.

In addition, in step S301, the eNB 200 allocates, to the UE 100-1, a discovery identifier associated with a condition for transmitting a discovery signal with high transmission power (High power). On the other hand, the eNB 200 allocates, to the UE 100-2, a discovery identifier associated with a condition for transmitting a discovery signal with low transmission power (Low power) and a condition that restricts a radio resource for transmitting a discovery signal.

In step S304, based on the discovery signal list, the eNB 200 performs scheduling for allocating a radio resource to a UE 100 that performs cellular communication.

Specifically, the eNB 200 performs scheduling so that a radio resource used for transmitting a discovery signal with low transmission power and a radio resource used for cellular communication (i.e., resource for cellular) share a common radio resource while a radio resource used for transmitting a discovery signal with high transmission power and the resource for cellular do not share a common radio resource. In the present embodiment, based on the discovery signal list, the eNB 200 allocates, to the UE 100-2, a radio resource used by the UE 100-2 for transmitting a discovery signal, and a radio resource (physical downlink shared channel (PDSCH)) used by the eNB 200 for transmission to the UE 100-2.

In addition, the eNB 200 can perform a process in step S304 at an appropriate timing after the respective discovery identifiers are allocated to the UEs 100-1 and 100-2. For example, the eNB 200 can perform the process not after step S303 but before step S303.

Each of steps S305 and S306 corresponds to step S204.

In addition, in step S305, the UE 100-1 transmits a discovery signal with high transmission power. In addition, in step S306, the UE 100-2 transmits a discovery signal with low transmission power.

In step S307, the eNB 200 transmits user data to the UE 100-3 using a common radio resource (PDSCH) shared with a radio resource used by the UE 100-2 for transmitting a discovery signal.

Step S308 corresponds to step S205.

Conclusion of Embodiment

In the present embodiment, the UE 100 and the eNB 200 store a discovery signal list relating to a plurality of conditions for controlling the transmission of discovery signals, and to a plurality of discovery identifiers. The eNB 200 specifies a specific identifier associated with a specific condition, from among a plurality of discovery identifiers, and transmits the specific identifier to the UE 100. The UE 100 receives the specific identifier, and performs control to transmit a discovery signal according to the specific condition. With this configuration, if the eNB 200 transmits a discovery identifier instead of transmitting information related to a condition for regulating discovery signals, the UE 100 can identify a specific condition from among a plurality of conditions based on the discovery identifier. Thus, increase in overhead can be suppressed.

In the present embodiment, the UE 100 transmits an identifier request to the eNB 200, and the eNB 200 receives the identifier request from the UE 100 and specifies a specific identifier based on the identifier request. With this configuration, the eNB 200 can transmit the specific identifier to the UE 100 that has transmitted the identifier request, i.e., the UE 100 that is to transmit a discovery signal, while omitting the specification and the transmission of a specific identifier for UEs 100 that have not transmitted an identifier request. Thus, increase in overhead can be suppressed.

In the present embodiment, an identifier request may include selection information used for selecting a discovery identifier that can be specified, from among a plurality of discovery identifiers, when the eNB 200 specifies a specific discovery identifier. The eNB 200 can specify a specific identifier based on the selection information. With this configuration, the eNB 200 can specify a discovery identifier according to the status of the UE 100.

In the present embodiment, before transmitting a discovery signal, the UE 100 performs control to transmit a list request for requesting a discovery signal list, to the NW 500. The NW 500 receives the list request from the UE 100 via the eNB 200. The NW 500 transmits a discovery signal list to the UE 100 in response to the list request. The UE 100 receives the discovery signal list transmitted from the NW 500 in response to the list request. With this configuration, the NW 500 can transmit a discovery signal list only to the UE 100 that requires the discovery signal list. Thus, increase in overhead can be suppressed.

In the present embodiment, a plurality of conditions may include a condition for controlling at least one of the transmission power for a discovery signal, the application of the discovery signal, a frequency range used for the transmission and/or reception of the discovery signal, a radio resource used for the transmission and/or reception of the discovery signal, and an open discovery indicating whether a UE 100 is discovered from a large indefinite number of UEs 100. With this configuration, the eNB 200 can control the transmission and/or reception of the discovery signal of the UE 100.

In the present embodiment, a specific condition includes a condition for controlling a radio resource used for the transmission of the discovery signal, and after specifying the specific identifier, based on the specific condition, the eNB 200 allocates a common radio resource shared with the radio resource, to the UE 100 that performs cellular communication. With this configuration, the radio resource can be effectively used.

Other Embodiments

The present disclosure has been described above based on an embodiment. Nevertheless, the description and the drawings that constitute part of the disclosure are not to be construed as limiting the present disclosure. Based on the disclosure, various alternative embodiments, examples, and operation techniques will become apparent to those skilled in the art.

For example, in the above-described embodiment, a network apparatus serving as the NW 500 is different from the eNB 200. Alternatively, the network apparatus may be the eNB 200. Yet alternatively, the network apparatus may be an apparatus constructing a core network (e.g., Mobility Management Entity (MME), Operation, Administration, Maintenance (OAM), etc.), or may be a management server. In addition, the eNB 200 may have functions similar to those of the network apparatus according to the present embodiment, and perform control according to the above-described embodiment in cooperation with another network apparatus.

In addition, in the above-described embodiment, the NW 500 creates a discovery signal list. This, however, is not a limiting case. The eNB 200 may create a discovery signal list. In addition, the eNB 200 may acquire a discovery signal list created by the NW 500, and the eNB 200 may add some parts to the discovery signal list, and partially change the discovery signal list.

For example, the eNB 200 may increase or decrease the number of discovery identifiers depending on the situation. Specifically, when a rate of discovery identifiers allocated to respective UEs 100 exceeds a threshold value, the eNB 200 may increase the number of discovery identifiers so that there is no overlap in discovery identifier number.

In addition, in the above-described embodiment, the discovery signal lists illustrated in FIGS. 8 and 9 are lists relating to the transmission of discovery signals. Alternatively, the discovery signal list may be a list relating to the reception of discovery signals, or a list relating to the transmission and reception of discovery signals. Thus, while the transmission of discovery signals has been described in the above-described embodiment, similar processing may be performed for the reception of discovery signals.

In addition, in the above-described embodiment, the UE 100 that receives a discovery signal may identify a radio resource used for the transmission of the discovery signal, based on the discovery signal list. The UE 100 can perform scanning of a band frequency and a time that are related to the identified radio resource. With this configuration, the UE 100 can suppress unnecessary consumption of a battery.

Furthermore, the eNB 200 may notify a currently-allocated discovery identifier by broadcast or unicast. The UE 100 may receive only a desired discovery signal using a discovery identifier and a discovery signal list. For example, the UE 100 may select whether to receive a discovery signal for advertisement distribution.

In addition, in the above-described embodiment, the eNB 200 may transmit, to the UE 100, information indicating an effective period of a specific identifier, together with the specific identifier. In addition, the UE 100 may control the identifier request to be transmitted when a discovery signal is transmitted and/received after the effective period of the specific identifier has passed. With this configuration, since the eNB 200 receives a request only from the UE 100 that actually performs D2D communication, the eNB 200 can set an allocated unused specific identifier as an unallocated specific identifier. As a result, the eNB 200 can appropriately manage discovery identifiers, and avoid a situation in which there is no discovery identifier allocatable to the UE 100 although there is an unused discovery identifier.

In addition, in the above-described embodiment, the eNB 200 receives, from a UE 100 to which a first specific identifier is allocated, discovery information including a second specific identifier allocated to another UE 100. When the eNB 200 determines based on a first specific condition associated with the first specific identifier and a second specific condition associated with the second specific identifier, that a discovery signal of the UE 100 and a discovery signal of the other UE 100 interfere with each other, the eNB 200 may specify a new specific identifier instead of the first specific identifier or the second specific identifier, and transmit the new specific identifier to the UE 100 or the other UE 100. With this configuration, interference between discovery signals can be avoided. For example, when the first specific identifier and the second specific identifier are associated with the same condition, the eNB 200 determines that interference occurs.

In addition, when the UE 100 detects a discovery signal including a discovery identifier belonging to the same pool, the UE 100 may transmit discovery information to the eNB 200. In this case, the discovery information may include a pool change request.

In addition, when there is a UE 100 to which a discovery identifier that reserves a large or small number of radio resources for the transmission and/or reception of discovery signals is allocated for a long time, the eNB 200 may shuffle discovery identifiers. The fairness can be thereby maintained.

In addition, in the above-described embodiment, the eNB 200 performs transmission so that a radio resource used for transmitting a discovery signal with low transmission power and a radio resource used for cellular communication share a common radio resource. This, however, is not a limiting case. For example, a radio resource used for the transmission and/or reception of discovery signals for D2D communication requiring high reliability (e.g., public safety, application such as data offload) may not share a common radio resource with a radio resource for cellular communication, and a radio resource used for the transmission and/or reception of discovery signals for D2D communication requiring low reliability (e.g., open discovery, application such as advertisement distribution) may share a common radio resource with a radio resource for cellular communication. In addition, in the above-described embodiment, a radio resource for cellular communication is a PDSCH. Alternatively, a radio resource for cellular communication may be a physical uplink shared channel (PUSCH).

In the above-described embodiment, the eNB 200 may transmit a discovery signal list to the UE 100 even if the eNB 200 does not receive a list request from the UE 100, and the eNB 200 may transmit a specific identifier to the UE 100 even if the eNB 200 does not receive an identifier request from the UE 100. In addition, when the UE 100 receives a specific identifier from the eNB 200 even though the UE 100 does not transmit an identifier request, the UE 100 may perform control of forcible transmission and/or reception of discovery signals.

In addition, in the above-described embodiment, the eNB 200 specifies a specific identifier from a discovery signal list. This, however, is not a limiting case. The UE 100 may specify a specific identifier from a discovery signal list. In this case, the UE 100 transmits the specified specific identifier to a UE 100. The eNB 200 can thereby manage information about the UE 100 that performs D2D communication. In addition, when the eNB 200 cannot allow the specific identifier specified by the UE 100, because of another UE 100, the eNB 200 may transmit, to the UE 100, information indicating that the use of the specific identifier is refused. In this case, the UE 100 can newly select a specific identifier.

In addition, in the above-described embodiment, the description has been given of an example in which the present disclosure is applied to an LTE system. The present disclosure, however, is not limited to the LTE system. The present disclosure may be applied to a system other than the LTE system.

In addition, Japanese Patent Application No. 2013-202766 (filed on Sep. 27, 2013) is incorporated by reference herein in its entirety.

INDUSTRIAL APPLICABILITY

A user terminal and a network apparatus according to the present disclosure can suppress increase in overhead when controlling the transmission and/or reception of discovery signals.

The invention claimed is:

1. A user terminal, comprising:
a receiver that receives a list transmitted from a base station, the list including discovery resource configurations; and
a controller that selects a discovery resource configuration from among the discovery resource configurations, and uses the selected discovery resource configuration to directly transmit a discovery signal to other user terminals, wherein
each of the discovery resource configurations includes:
time resource information indicating time resources used for transmitting a discovery signal;
frequency resource information indicating frequency resources used for transmitting the discovery signal and including a range of continuous resource block numbers; and
power information indicating transmission power used for transmitting the discovery signal.

2. The user terminal according to claim 1, wherein the receiver receives the list included in a system information block (SIB).

3. The user terminal according to claim 1, wherein the controller transmits a request to the base station, the request requesting resources used for transmitting the discovery signal, and
the receiver receives the list transmitted from the base station in response to the request.

4. The user terminal according to claim 1, wherein each of the discovery resource configurations further includes band information indicating a frequency band used for transmitting the discovery signal.

5. The user terminal according to claim 1, wherein each of the discovery resource configurations further includes information indicating whether corresponding discovery resource configuration should be used for a discovery transmission for a public safety.

6. An apparatus for controlling a user terminal, comprising:
a processor causes the user terminal to
receive a list transmitted from a base station, the list including discovery resource configurations;
select a discovery resource configuration from among the discovery resource configurations; and
use the selected discovery resource configuration to directly transmit a discovery signal to other user terminals, wherein
each of the discovery resource configurations includes:
time resource information indicating time resources used for transmitting the discovery signal;
frequency resource information indicating frequency resources used for transmitting the discovery signal and including a range of continuous resource block numbers; and
power information indicating transmission power used for transmitting the discovery signal.

7. The user terminal according to claim 1, wherein the receiver receives the list transmitted from the base station by a broadcast signaling, the list being used for the user terminal to transmit the discovery signal.

8. A user terminal for directly transmitting a discovery signal to other user terminals, comprising:
a receiver configured to receive a list transmitted from a base station by a system information block (SIB), the list including a plurality of discovery resource configurations used for the user terminal to transmit the discovery signal, wherein each of the discovery resource configurations includes power information indicating transmission power used for transmitting the discovery signal; and
a controller configured to
select a discovery resource configuration from among the discovery resource configurations included in the received list, before transmitting the discovery signal,
determine transmission power of the discovery signal based on the power information included in the selected discovery resource configuration, and
directly transmit the discovery signal using the determined transmission power,
wherein each of the discovery resource configurations further includes:
time resource information indicating time resources used for transmitting the discovery signal; and
frequency resource information indicating resource blocks used for transmitting the discovery signal and including a range of continuous resource block numbers.

9. The user terminal according to claim 8, wherein the SIB further includes band list containing a plurality of frequency bands used for transmitting the discovery signal, and
each of the discovery resource configurations associated with a frequency band included in the frequency bands, the controller is further configured to
determine a frequency band associated with the selected discovery resource configuration,
determine resource blocks within the determined frequency band, based on the frequency resource information included in the selected discovery resource configuration, directly transmit the discovery signal using the determined frequency band and the determined resource blocks.

10. The user terminal according to claim 8, wherein the SIB further includes information associated with each of discovery resource configurations, the information indicating whether corresponding discovery resource configuration should be used for a discovery transmission for a public safety.

* * * * *